E. H. BASS.
CLEAT FOR TRACTOR WHEELS.
APPLICATION FILED JUNE 22, 1921.
1,417,020.
Patented May 23, 1922.
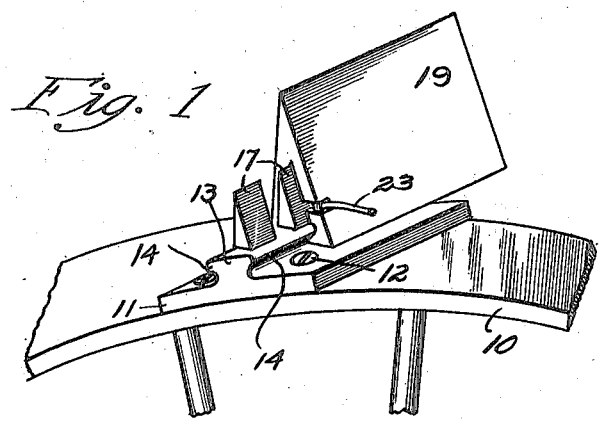
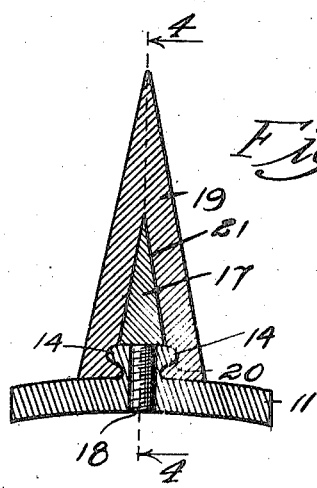
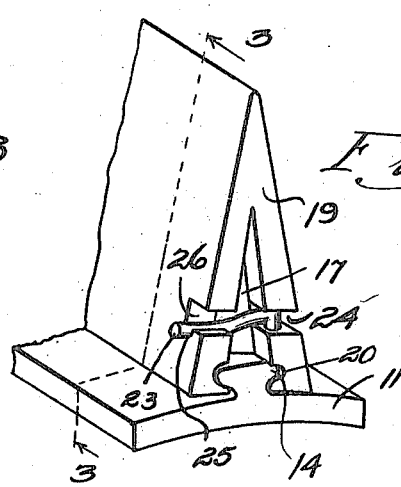
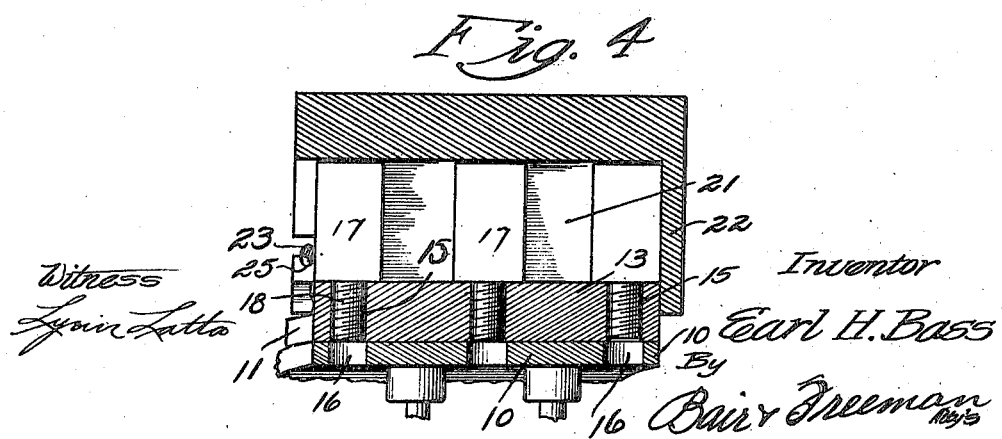
Inventor
Earl H. Bass
By
Bair & Freeman
Witness
Lynn Latta

UNITED STATES PATENT OFFICE.

EARL H. BASS, OF DERBY, IOWA.

CLEAT FOR TRACTOR WHEELS.

1,417,020.   Specification of Letters Patent.   Patented May 23, 1922.

Application filed June 22, 1921. Serial No. 479,496.

*To all whom it may concern:*

Be it known that I, EARL H. BASS, a citizen of the United States, and a resident of Derby, in the county of Lucas and State of Iowa, have invented a certain new and useful Cleat for Tractor Wheels, of which the following is a specification.

The object of my invention is to provide a cleat especially designed for tractor wheels, which cleat is interchangeable and of comparatively cheap construction, durable and simple.

More particularly, my invention relates to an arrangement of cleats, whereby by a slight change, prongs may be used for engaging the ground, or a spade cleat may be used, and if desirable, when traveling over pavement, the prongs and spade cleat member may be removed, and yet the tractor wheels be provided with a cleat, which I shall call the base.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a portion of a tractor wheel with my improved cleat arrangement shown thereon.

Figure 2 is a perspective view of one end of the spade cleat member, showing it in its locked position.

Figure 3 is a sectional view taken on the line 3—3 of Figure 2, showing the arrangement of the spade member with relation to the prongs; and Figure 4 is a central, vertical, sectional view taken on the line 4—4 of Figure 3.

In the accompanying drawings, I have used the reference numeral 10 to indicate the rim of an ordinary tractor wheel, which is provided with a base 11 secured to the rim 10 by means of bolts or the like 12. The heads of the bolts 12 are countersunk, so that they are flush with the upper surface of the base 11, the purpose of which will be hereinafter more fully set forth.

The base 11 is provided with a raised portion 13, which has a pair of ribs 14 on its sides. The raised portion 13 of the base 11 is provided with screw-threaded openings 15. The screw-threaded openings 15, which are formed in the raised portion of the base 11, register with openings 16 formed in the rim 10.

The parts just described form a cleat, which I call the base.

When the base 11 is secured to the rim 10, it forms a sufficient cleat for using the tractor wheels upon hard surfaces, such as pavements.

When it is desired to use the tractor wheels on hard country roads, which are not paved, I provide a number of prongs 17, having screw-threaded shanks 18, secured thereto, which screw-threaded shanks are received in the screw-threaded openings 15 formed in the base 11.

It will be understood that when the base 11 is used without the prongs 17, that dirt will collect within the openings. By providing the openings 16 in the rim, it is an easy matter to punch some sharp instrument clear through the screw-threaded openings 15 and the openings 16, thus permitting the shanks 18 of the prongs 17 to be received therein.

When it is desired to use the tractor for farm work, as for plowing, and the tractor is used in comparatively loose or soft material, it is then highly desirable to provide a spade cleat.

I provide a spade cleat 19, having a pair of grooves 20 formed therein, which grooves register with the ribs 14 of the raised portion 13 of the base.

The spade cleat 19 is provided with a central opening 21, which is of substantially the same size as the prongs 17, whereby the spade cleat may be slid over the prongs 17 and used without the necessity of removing the prongs 17.

One end of the spade cleat is closed, as at 22, while the opposite side is left open for permitting it to pass over the prongs 17.

After the spade cleat has been placed in position, it is desirable to provide some easy means for locking the cleat against longitudinal movement and for holding it in position.

In order to accomplish this, I provide in the open end of the spade cleat 19, a swinging locking bar 23 made of resilient material, which locking bar is pivoted in the sides of a notch 24, which is formed in the end of the cleat 19.

The free end of the locking bar 23 is received in a groove 25 formed in a notch 26 in the end of the cleat 19.

The locking bar 23, due to the fact that it is made of resilient material, will be permitted to swing into the notch 26, and then be received in the groove 25, thus forming a lock for the holding of the spade cleat in position.

When it is desired to remove the spade cleat, it is an easy matter to raise the end of the locking bar 23 slightly, and then swing it outwardly on its pivot through the notch 26. The spade cleat 19 may then be easily removed from over the prongs.

The prongs 17 are of substantially the same size and shape, as the opening 21, so that when the spade cleat is in position, the prongs 17 will be snugly received in the cleat 19, thus reinforcing the spade cleat.

The lower surface of the cleat 19 is flush with the upper surface of the base 11, thus preventing any undesired movement of the cleat 19 relative to the base 11.

The arrangement of the prongs 17, so that they reinforce the cleat 19 permits me to make the cleat of comparatively light material, yet with the desired amount of strength.

It will be seen that I have provided an interchangeable cleat for tractor wheels, which may be used to meet the various conditions that tractors are normally operated under.

The arrangement of the cleat 19, whereby it may be slid longitudinally on the base 11 and quickly and easily locked in position is very desirable.

With the cleats now in use, it is necessary to remove one set of cleats and bolt or secure another set thereto in place thereof.

It may be stated that the prong cleats need be removed very seldom, as tractors used upon farms require only the two sets of cleats, the prong cleats and the spade cleat. My arrangement of cleats makes it possible to change from one type to another very quickly.

Some changes may be made in the construction and arrangement of the various parts of my device, without departing from the essential features and purposes of my invention, and it is my intention to cover by my claims, any modified forms of structure, or use of mechanical equivalents, which may be reasonably included within their scope.

I claim as my invention:

1. A cleat for tractor wheels or the like, including a base member fixed to the wheel having a pair of guide ribs thereon and a number of prongs fixed therein, a removable spade cleat member having grooves therein adapted to register with said guide ribs, said spade cleat member having an opening therein of substantially the size of said prongs, whereby said spade cleat member may be slid on said guide ribs and over said prongs for the purposes stated.

2. A cleat for tractor wheels or the like, including a base member fixed to the wheel having a pair of guide ribs thereon and a number of prongs fixed therein, a removable spade cleat member having grooves therein adapted to register with said guide ribs, said spade cleat member having an opening therein of substantially the size of said prongs, whereby said spade cleat member may be slid on said guide ribs and over said prongs, and a locking member for holding the spade cleat against movement for the purposes stated.

3. A cleat for wheels or the like including a base member secured to the rim of the wheel, a pair of guide ribs formed on the base, said base having a plurality of screw-threaded openings formed therein between said guide ribs, prongs having screw-threaded shanks received in said screw-threaded openings, a spade cleat member having a pair of grooves therein adapted to receive said guide ribs, said spade cleat being hollow, whereby said spade cleat may be slid on said base and over said prongs for covering them and permitting the entire device to be used as a spade cleat for wheels.

4. A cleat for wheels or the like including a base member secured to the rim of the wheel, a pair of guide ribs formed on the base, said base having a plurality of screw-threaded openings formed therein between said guide ribs, prongs having screw-threaded shanks received in said screw-threaded openings, a spade cleat member having a pair of grooves therein adapted to receive said guide ribs, said spade cleat being hollow, whereby said spade cleat may be slid on said base and over said prongs for covering them and a locking bar adapted to be yieldingly held in position for preventing movement of said spade cleat member.

5. A cleat for wheels or the like including a base member secured to the rim of the wheel, a pair of guide ribs formed on the base, said base having a plurality of screw-threaded openings formed therein between said guide ribs, prongs having screw-threaded shanks received in said screw-threaded openings, a spade cleat member having a pair of grooves therein adapted to receive said guide ribs, said spade cleat member being hollow and having one end open and the other end closed, whereby the open end will permit the spade cleat member to be slid on said base and over said prongs, and a locking bar pivotally secured to the open end of said spade cleat member for holding it against movement.

Des Moines, Iowa, June 9, 1921.

EARL H. BASS.